United States Patent [19]

Wagener et al.

[11] Patent Number: 4,695,559

[45] Date of Patent: Sep. 22, 1987

[54] CATALYST FOR THE SELECTIVE REDUCTION OF NITROGEN OXIDES IN WASTE GASES AND PROCESS FOR THE MANUFACTURE OF SUCH A CATALYST

[75] Inventors: Dietrich Wagener, Essen; Karl H. Laue, Hattingen; Egmar Wunderlich, Mülheim; Theo Sander, Essen; Claus Flockenhaus, Essen; Erich Hackler, Essen; Biagoje Levkov, Wiesbaden; Daniel Grimm, Schlangenbad-Bärstadt; Hartmut Kainer, Wiesbaden; Hermann Stein, Bad Dürkheim; Hans-Eugen Bühler, Königstein; Horst Kalfa, Idstein; Johann Jansen, Duisburg; Werner Stender, Raesfeld; Arnold Max, Bottrop, all of Fed. Rep. of Germany

[73] Assignees: Didier-Werke AG, Wiesbaden; Didier Engineering GmbH, Essen, both of Fed. Rep. of Germany

[21] Appl. No.: 831,142

[22] Filed: Feb. 19, 1986

[30] Foreign Application Priority Data

Feb. 19, 1985 [DE] Fed. Rep. of Germany ....... 3505648

[51] Int. Cl.$^4$ ..................... B01J 21/18; B01J 27/053; B01J 27/18
[52] U.S. Cl. .................... 502/183; 502/209; 502/217; 502/241; 423/239
[58] Field of Search ............... 502/241, 183, 209, 217; 423/239 A

[56] References Cited

U.S. PATENT DOCUMENTS

| | | | |
|---|---|---|---|
| 3,928,238 | 12/1975 | Koberstein et al. | 502/241 |
| 4,049,777 | 9/1977 | Divivier et al. | 423/239 |
| 4,054,640 | 10/1977 | Iwata et al. | 423/239 A |
| 4,093,561 | 6/1978 | Nishikawa et al. | 252/466 J |
| 4,107,272 | 8/1978 | Mori et al. | 423/239 A |

*Primary Examiner*—W. J. Shine
*Attorney, Agent, or Firm*—Nils H. Ljungman

[57] ABSTRACT

A catalyst for use with ammonia for the selective reduction of nitrogen oxides in waste gases. The catalyst comprises a mixture of substances which has high activity and selectivity with regard to nitrogen oxide conversion and high sorption capabilities with regard to ammonia, but low oxidation capabilities with regard to sulfur dioxide, ammonia, or similar substances. The invention also provides a process for the manufacture and use of such catalysts.

17 Claims, 3 Drawing Figures

CATALYST FOR THE SELECTIVE REDUCTION OF NITROGEN OXIDES IN WASTE GASES AND PROCESS FOR THE MANUFACTURE OF SUCH A CATALYST

CROSS REFERENCE TO CO-PENDING APPLICATIONS

Co-pending application Ser. No. 768,417 (Attorney Docket No. NHL-DWA-08), filed on Aug. 22, 1985, entitled "Method and Apparatus For The Reactivation Of A Catalyst", corresponding to Federal Republic of Germany Patent Application No. P 34 30 887.3, filed on Aug. 22, 1984; co-pending application Ser. No. 768,418 (Attorney Docket No. NHL-DWA-09), filed on Aug. 22, 1985, entitled "Process For Cleaning An Exhaust Gas", corresponding to Federal Republic of Germany Patent Application No. P 34 30 870.9, filed on Aug. 22, 1984; and co-pending application Ser. No. 768,508 (Attorney Docket No. NHL-DWA-10), filed on Aug. 22, 1985, entitled "Catalyst For Removal Of Nitrogen Oxides From Exhaust Gases", corresponding to Federal Republic of Germany Patent Application No. P 34 30 886.5, filed on Aug. 22, 1984, are all assigned to the same assignee as the instant application and are incorporated herein by reference as if the texts thereof were fully set forth herein.

BACKGROUND OF THE INVENTION

1. Field of the Invention:

The invention relates to a catalyst for the selective reduction of nitrogen oxides in waste gases by means of ammonia.

2. Description of the Prior Art:

Such catalysts are known, specifically, for example, catalysts containing $Fe_2O_3$, $Cr_2O_3$ or $V_2O_5$. In terms of their action, however, these catalysts leave something to be desired.

Some examples of catalytic technology are found in U.S. Pat. No. 4,259,312, entitled "Process And Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned the same assignee as the instant application.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases".

Examples of reactivation of catalysts useful in nitrogen oxide removal are described in U.S. Pat. No. 4,044,102, entitled "Method For Treating Exhaust Gases", and U.S. Pat. No. 4,043,939, entitled "Reactivation Of Catalysts Useful For Nitrogen Oxide Removal." All of the above-cited patents are incorporated herein by reference as if the texts thereof were fully set forth herein.

OBJECTS OF THE INVENTION

An object of the present invention is to improve a catalyst of the type described above with regard to its action.

Another object of the present invention is to provide a catalyst with high sorptive properties with regard to ammonia.

A further object of the present invention is to provide a catalyst with high selectively with regard to oxides of nitrogen.

A yet further object of the present invention is to provide a catalyst with low oxidation capability with regard to compounds other than oxides of nitrogen.

A still further object of the present invention is to provide a catalyst with low oxidation capability with regard to sulfur dioxide and ammonia.

SUMMARY OF THE INVENTION

These objectives are essentially achieved by means of a mixture of substances which has a high activity and selectivity with regard to the conversion of nitrogen oxide, a high sorption capability for ammonia, and a low oxidation capability for sulfur dioxide, ammonia, or similar substances.

One aspect of the present invention resides broadly in a catalyst for selective reduction of nitrogen oxide, the catalyst being a catalyst for reacting waste gases with ammonia. The catalyst comprises a mixture of substances, the mixture being highly active and selective, with regard to breaking down of nitrogen oxides, and highly sorptive of ammonia, and having a low oxidation capability for compounds other than nitrogen oxides.

Another aspect of the present invention resides broadly in a process for the manufacture of a catalyst for reducing oxides of nitrogen in waste gases in the presence of ammonia. The process comprises the steps of mixing substances having a grain size of less than substantially 0.2 mm, which substances, in combination, are highly active and selective with respect to breaking down oxides of nitrogen, to yield a material highly sorptive of ammonia and having low oxidation of other substances, and bonding the mixed substances with phosphoric acid.

A further aspect of the present invention resides broadly in a process for removing oxides of nitrogen from waste gas. The process comprises the steps of admitting ammonia to a sorptive mixed catalyst, adsorbing the ammonia in the catalyst, admitting waste gases to the catalyst, converting the oxide of nitrogen highly selectively by catalystic action of the catalyst to other products, and oxidizing substances from at least one of the members of the group consisting essentially of sulfur dioxide and ammonia only slightly.

BRIEF DESCRIPTION OF THE DRAWINGS

Advantageous embodiments of the present invention are illustrated in the accompanying drawings, in which.

DESCRIPTION OF THE PREFERRED EMBODIMENTS

Figure 1:
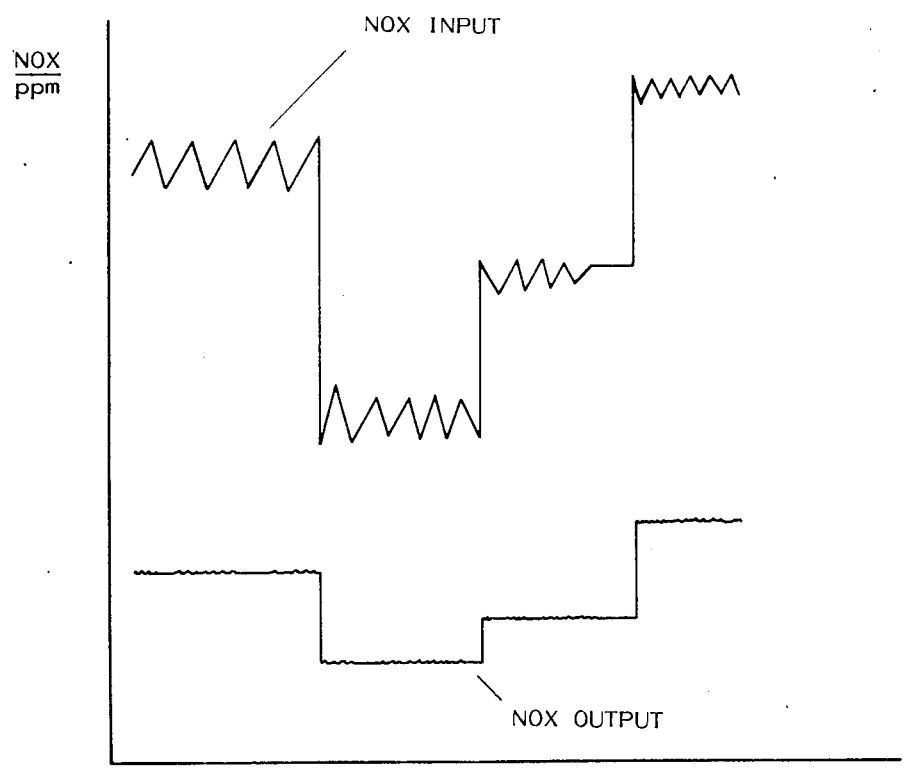
FIG. 1 shows how the catalyst described by the present invention largely compensates for fluctuations in the nitrogen oxide input concentration.
Figure 2:
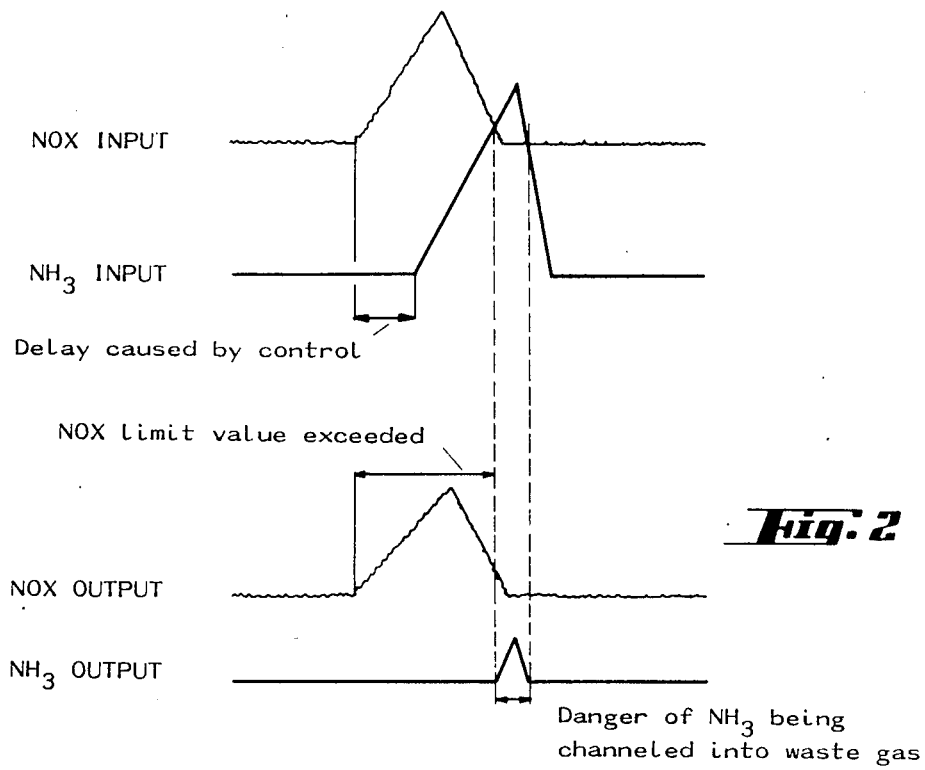
FIG. 2 shows how the channeling of ammonia into the waste gas can be prevented with the catalyst according to the present invention.
Figure 3:
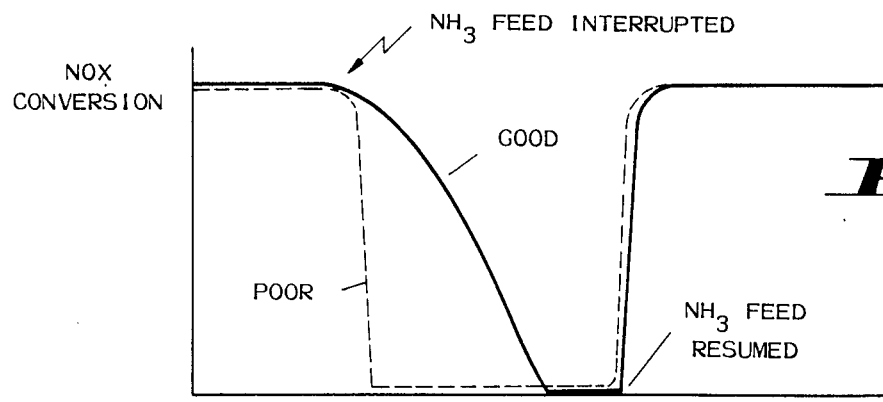
FIG. 3 shows the control action of a catalyst according to the present invention because of the high sorption capability for ammonia.

The catalyst, as taught by the present invention, retains an extraordinarily good control action, in addition to its known high activity and selectivity. Its possible applications, moreover, are very economical. The good control action is specifically determined by the relatively high sorption capability for ammonia, so that even with significant nitrogen oxide fluctuations in the waste gas to be purified, the danger of ammonia being channeled into the gas can be prevented, which would otherwise lead to problems in the downstream equipment. Because of the low oxidation capability of the catalyst described by the invention, there is no further oxidation of the sulfur dioxide, ammonia, or similar substances found in the gas to be purified. The sulfur trioxide, which occurs when sulfur dioxide is further oxidized, would otherwise be converted to sulfates with the ammonia in the waste gas stream. The oxidation of the ammonia added for the reduction to water and nitrogen, which does not take place because of the low oxidation capability of the catalyst, reduces the consumption of operating materials, so that with a purification process operated according to the invention, more economical operation can be achieved.

For most applications of the catalyst, in a special embodiment of the invention, it is particularly advantageous if the sorption capability for ammonia is high enough so that in a temperature range of between approximately 280° C. and 450° C., and in spite of nitrogen oxide fluctuations of up to 200 milligrams per cubic meter and essentially constant ammonia feed, no ammonia is channeled into the waste gas.

In another configuration of the invention, it is advantageous if the activity and selectively regarding the nitrogen oxide conversion are essentially constant in the temperature range between 280° C. and 450° C. and the oxidation capability is negligible.

According to another feature of the present invention, the catalyst is characterized by macropores between approximately 0.5 and 50 microns.

The characteristics of the invention described above can be achieved, for example, by a mixture of substances, which exhibit the basic substances A and B, whereby the basic substance A comprises the following components:

89 to 92 percent by weight of $Fe_2O_3$;
  3 to 4 percent by weight of $Fe_3O_4$;
  4 to 5 percent by weight of $SiO_2$;
  1 to 2 percent by weight of $Al_2O_3$;
  0.01 to 0.2 percent by weight of $MnO$;
  0.01 to 0.03 percent by weight of $CaO$;
  0.01 to 0.02 percent by weight of $MgO$; and
  0.7 to 0.001 percent by weight of $V_2O_5$,
and the basic substance B comprises the following components:
  30 to 48 percent by weight of $Cr_2O_3$;
  12 to 30 percent by weight of $Fe_2O_3$;
  10 to 30 percent by weight of $Al_2O_3$;
  10 to 25 percent by weight of $MgO$; and
  1 to 5 percent by weight of $SiO_2$.

Surprisingly, such mixtures of substances have high activity and selectivity for nitrogen oxide conversion, high sorption capability for ammonia and low oxidation capacity for sulfur dioxide and ammonia, especially in the temperature range of between approximately 350° C. and 450° C. This is all the more surprising, since the known catalysts which contain $Fe_2O_3/Cr_2O_3$, of course, have relatively high activity and selectivity, as do combinations of $V_2O_5$ and $TiO_2$ in mixtures with $WO_3$. But their sorption capability with regard to ammonia is low, so that there is a poor control characteristic in the presence of severe and spontaneous nitrogen oxide fluctuations. The characteristics of the mixture of basic substances A and B are, therefore, surprising, because mixtures of $V_2O_5$ and $TiO_2$ already exhibit a significant oxidation-promotion effect in a temperature range from 350° C. to 450° C., which could only be limited by the addition of inhibitors, or else such a catalyst could not be used for gases containing sulfur. In the temperature range from 280° C. to 350° C., $V_2O_5/TiO_2$ catalysts exhibit relatively high activity and selectivity with regard to the nitrogen oxide conversion, as well as a low tendency to oxidation. They also exhibit a low sorption capability with regard to ammonia, so that their control characteristic is poor. $Fe_2O_3/Cr_2O_3$ mixtures exhibit a high sorption capability at temperatures from 280° C. to 350° C., which results in a good control behavior, but their activity is low.

Furthermore, it has been shown that, surprisingly, the activity of the mixture of substances can be significantly increased by sulfatization.

The same is true for a temperature range from 280° C. to 350° C., if the $V_2O_5$ is finely divided in the mixture.

According to one feature of the process described by the invention, sufficient strength and water-resistance can be imparted to the dry mixture of substances of the catalyst if it is present in a grain size of less than 0.2 mm and bonded with a phosphate acid such as phosphoric acid.

The activation of the catalyst is carried out according to another characteristic feature, preferably by means of sulfuric acid or vanadium sulfate ($VOSO_4.2H_2O$) by saturation.

A heat treatment, that is, calcination, of the mixture of substances is preferably done at 200° C. to 500° C., whereby temperature increase rates of preferably between about 500° C. per minute and about 1° C. per minute are used.

It is also proposed that fiber material of glass and/or ceramic and/or carbon and/or steel be added to the mixture of substances, which fiber material is used as a support structure during the molding of the mixture of substances into moldings.

The molding of the mixture of substances is preferably done isostatically into smooth or corrugated plates.

It has thereby been shown to be particularly advantageous if a molding pressure of between about 0.1 and about 100 metric tons per square centimeter.

The substances are molded, preferably into plates with a thickness of approximately 0.5 to 5 mm, and preferably approximately 1 to 3 mm.

According to another embodiment of the invention, the size of the plates is set during molding to between approximately 1 and 10,000 square centimeters.

An advantageous application of a catalyst of the present invention comprises its use in the form of plates or corrugated plates at specified intervals in integrated units or cassettes, for the creation of a free-passage catalyst unit. The cassettes can exhibit corrugated spacer plates to separate the catalyst, present in the form of plates. This configuration results in infinitely long slits. The cassettes are appropriately combined to form complete reactors.

The invention as described hereinabove in the context of the preferred embodiments is not to be taken as limited to all of the provided details thereof, since modifications and variations thereof may be made without departing from the spirit and scope of the invention.

What is claimed is:

1. A catalyst for selective reduction of nitrogen oxides, said catalyst being a catalyst for reacting waste gases with ammonia, said catalyst comprising:

a mixture of two basic substances which are A and B, and wherein the basic substance A comprises the following components:

about 89 to about 92 percent by weight of $Fe_2O_3$;
about 3 to about 4 percent by weight of $Fe_3O_4$;
about 4 to about 5 percent by weight of $SiO_2$;
about 1 to about 2 percent by weight of $Al_2O_3$;
about 0.01 to about 0.2 percent by weight of $MnO$;
about 0.01 to about 0.03 percent by weight of $CaO$;
about 0.01 to about 0.02 percent by weight of $MgO$; and
about 0.7 to about 0.001 percent by weight of $V_2O_5$, and the basic substance B comprises the following components:

about 30 to about 48 percent by weight of $Cr_2O_3$;
about 12 to about 30 percent by weight of $Fe_2O_3$;
about 10 to about 30 percent by weight of $Al_2O_3$;
about 10 to about 25 percent by weight of $MgO$; and
about 1 to about 5 percent by weight of $SiO_2$.

2. The catalyst according to claim 1, wherein said mixture of substances comprises a sulfated mixture.

3. The catalyst according to claim 2, wherein said $V_2O_5$ in said basic substance A, within said mixture of substances, is finely divided.

4. The catalyst according to claim 1 wherein
said mixture of substances A and B is highly active and selective with regard to breaking down of nitrogen oxides;
said mixture of substances being highly sorptive of ammonia; and
said mixture of substances having a low oxidation capability for compounds other than nitrogen oxides.

5. The catalyst according to claim 4, wherein said compounds other than nitrogen oxides comprise sulfur dioxide and ammonia.

6. The catalyst according to claim 4 which is sorptive of ammonia to permit fluctuations of nitrogen oxides of up to 200 milligrams per cubic meter in a temperature range of about 280° C. to about 450° C. while substantially completely taking up a substantial constant feed of ammonia.

7. The catalyst according to claim 6, wherein the activity and selectivity, with regard to the nitrogen oxide conversion, are essentially constant in the temperature range between substantially about 280° C. and about 450° C.

8. The catalyst according to claim 7 having macropores with a size range between substantially about 0.5 microns and about 50 microns.

9. A process for the manufacture of a catalyst for reducing oxides of nitrogen in waste gases in the presence of ammonia, said process comprising the steps of:

mixing substances A and B having a grain size of less than substantially 0.2 mm, which substances, in combination, are highly active and selective with respect to breaking down oxides of nitrogen, to yield a material highly sorbtive of ammonia and having low oxidation of other substances; and bonding said mixed substances with phosphoric acid;

and wherein the substance A comprises the following components;

about 89 to about 92 percent by weight of $Fe_2O_3$;
about 3 to about 4 percent by weight of $Fe_3O_4$;
about 4 to about 5 percent by weight of $SiO_2$;
about 1 to about 2 percent by weight of $Al_2O_3$;
about 0.01 to about 0.2 percent by weight of $MnO$;
about 0.01 to about 0.03 percent by weight of $CaO$;
about 0.01 to about 0.02 percent by weight of $MgO$; and
about 0.7 to about 0.001 percent by weight of $V_2O_5$, and wherein the substance B comprises the following components:

about 30 to about 48 percent by weight of $Cr_2O_3$;
about 12 to about 30 percent by weight of $Fe_2O_3$;
about 10 to about 30 percent by weight of $Al_2O_3$;
about 10 to about 25 percent by weight of $MgO$; and
about 1 to about 5 percent by weight of $SiO_2$.

10. The process according to claim 9, including the further steps of saturating said mixture of substances with at least one of the members of the group consisting essentially of sulfuric acid and vanadium sulfate.

11. The process according to claim 10, including heating said mixture of substances in the range of substantially about 200° C. to about 500° C.

12. The process according to claim 11, wherein said heating is performed at increasing temperature gradient rates of substantially between about 500° C. per minute and about 1° C. per minute.

13. The process according to claim 12, including adding fiber material to said mixture of substances, said fiber material being chosen from at least one member of the group consisting essentially of glass fiber, ceramic fiber, carbon fiber and steel fiber.

14. The process according to claim 9, including molding said mixture of substances into plates.

15. The process according to claim 14, including molding said plates at a pressure of substantially between about 0.1 and about 100 metric tons per square centimeter.

16. The process according to claim 15, including molding said plates to a thickness of substantially about 0.5 mm to about 5 mm.

17. The process according to claim 16, wherein said plates are molded to a size substantially between about 1 square centimeter and about 10,000 square centimeters.

* * * * *